Patented June 30, 1953

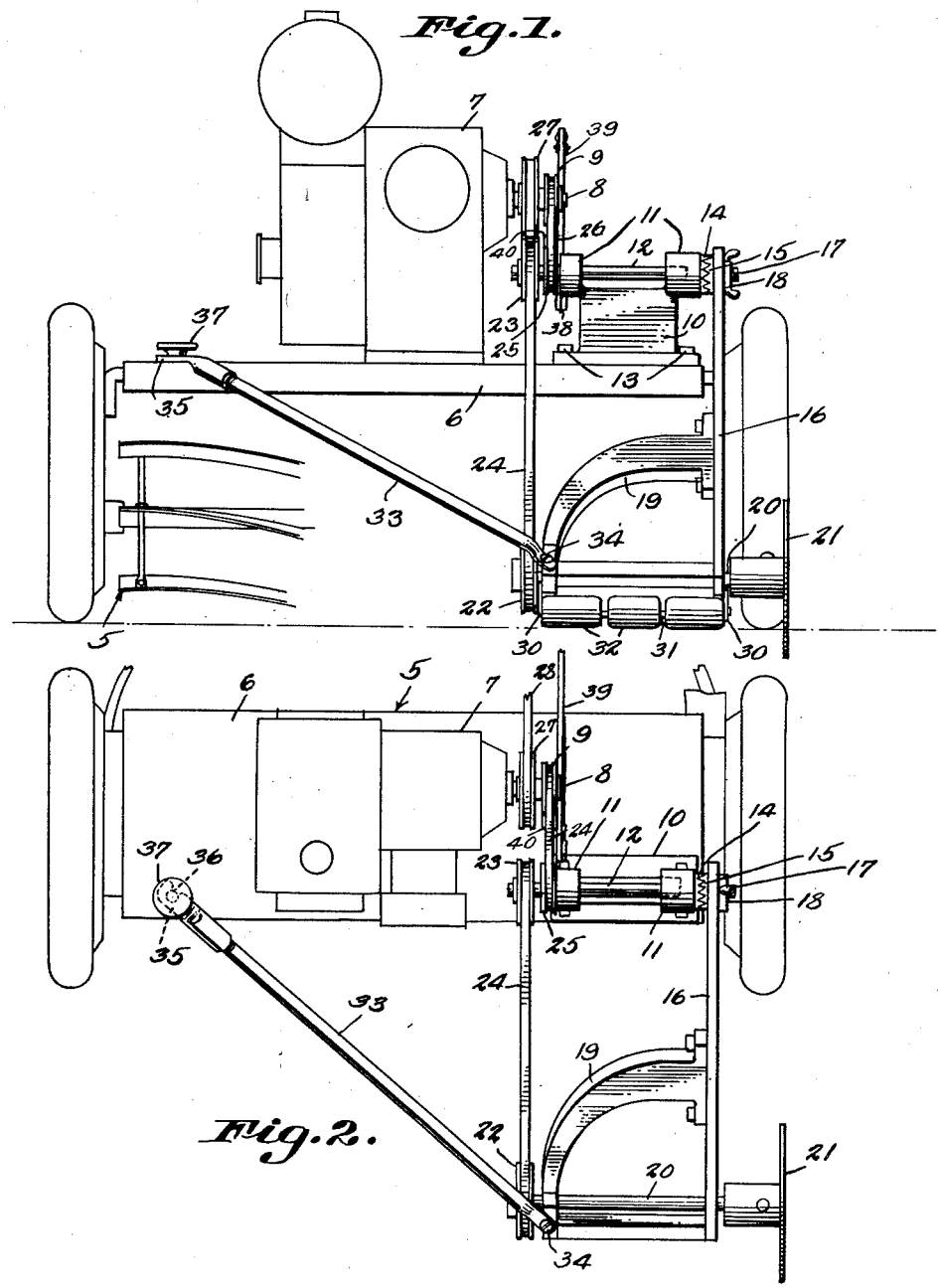

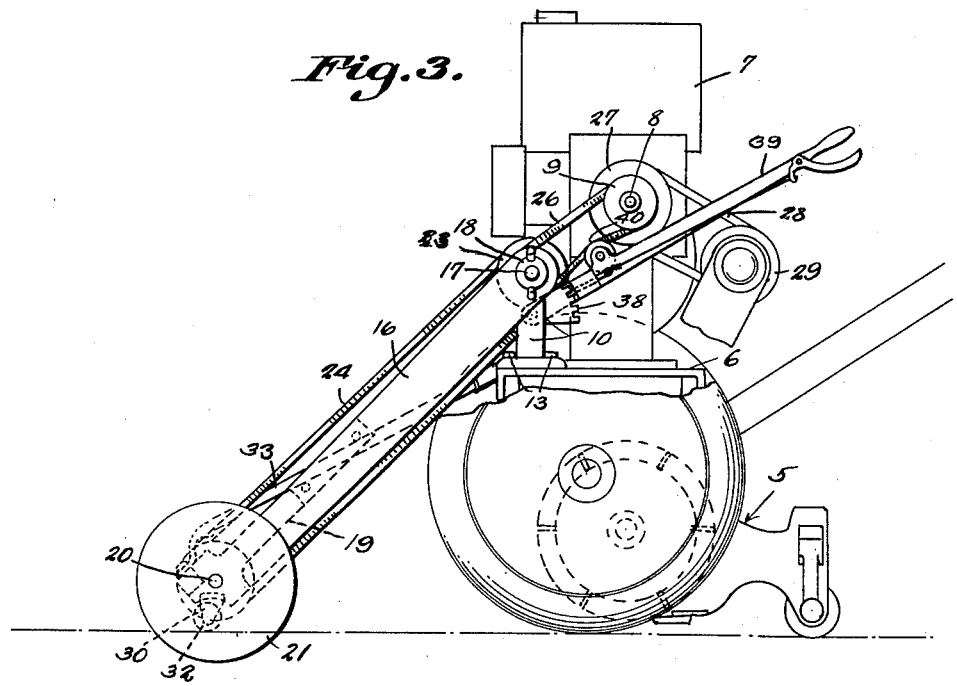
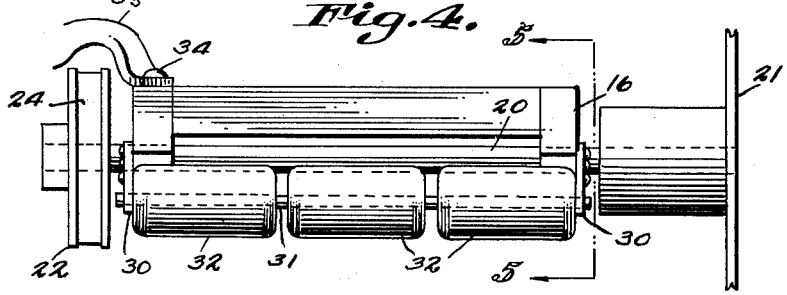
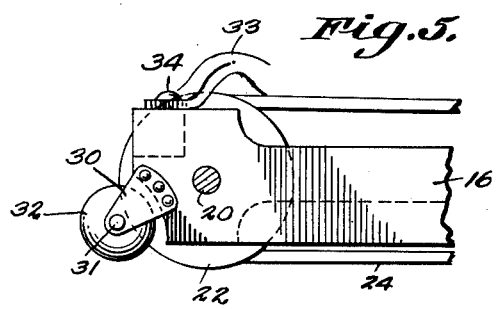

2,643,503

UNITED STATES PATENT OFFICE 2,643,503

DEMOUNTABLE EDGER ATTACHMENT FOR LAWN MOWERS

John D. Noyes, Fort Lauderdale, Fla.

Application February 27, 1951, Serial No. 212,873

2 Claims. (Cl. 56—25.4)

This invention relates to an attachment for power lawn mowers, the primary object of the invention being to provide means for utilizing the conventional power lawn mower for use in edging driveways, walkways or the like.

An important object of the invention is to provide an attachment of this character which may be readily and easily dismantled and removed from said lawn mower, the structure being such that the attachment may be readily and easily mounted when it is desired to edge a walkway or driveway.

Another object of the invention is to provide a device of this character which may be swung upwardly out of contact with the ground surface, should it be desired to mow a plot of grass, without detaching the device from the mower.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings,

Figure 1 is a front elevational view of a power mower equipped with an attachment, constructed in accordance with the invention.

Fig. 2 is a plan view thereof.

Fig. 3 is an end view of a mower with the edging device attached thereto, a portion of the mower wheel having been broken away.

Fig. 4 is an elevational view of the front end of the attachment.

Fig. 5 is a fragmental side elevational view of the forward or cutting end of the attachment.

Referring to the drawings in detail, the usual conventional power lawn mower is indicated generally by the reference character 5, and includes a platform 6 on which the usual motor 7 is mounted.

The reference character 8 indicates the motor shaft on which the pulley 9 is mounted, the pulley 9 constituting the power pulley for providing the power for operating the attachment, to be hereinafter more fully described.

The attachment comprises a stand 10 having bearings 11 in which the horizontal shaft 12 operates, the stand 10 being bolted to the platform 6 by means of bolts 13.

One of the bearings 11 is provided with teeth 14 extending laterally from one side edge thereof, the teeth 14 cooperating with the teeth 15 carried on the inner surface of the arm 16 which arm 16 is mounted on the stub shaft 17 that extends laterally from the bearing 11 having the teeth 14, the stub shaft 17 having a threaded end on which the wing nut 18 is mounted to secure the arm 16 to the bearing 11. Due to this construction, it will be obvious that by loosening the wing nut 18 and moving the arm 16, the arm 16 may be either elevated to a position parallel with the platform 6, or may be lowered to a position as shown by Fig. 1 of the drawings.

Connected with the arm 16, is a curved supporting arm 19 which extends downwardly to a point in a line with the free end of the arm 16, the arms 16 and 19 being formed with bearing openings, in which the shaft 20 operates, the shaft 20 having one of its ends extended beyond the arm 16, where it provides a support for the rotary edging disc 21. On the opposite end of the shaft 20 is the pulley 22 which is secured to the shaft to rotate therewith. The shaft 12 is provided with the pulley 23 over which the belt 24 operates, the belt 24 transmitting movement to the shaft 20. A second pulley 25 is secured on the shaft 12, and is rotated by means of the belt 26 which operates over the pulley 9 secured on the shaft 8.

Secured to the stand 10, is the segment 38 to which the lever 39 is pivotally connected, the lever providing a support for the idle pulley 40 which is movable into contact with the belt 26 tightening the belt 26 to cause the rotation of the pulley and shaft 12 on which it is mounted. When the idle pulley 40 is moved to disengage the belt 26, it is obvious that the shaft 12 will be thrown out of operation.

The pulley 27 is also mounted on the motor shaft 8, and transmits movement to the mechanism operating the motor mower, through the medium of the belt 28 and pulley 29, the pulley 29 operating the usual power motor mechanism, not shown. Secured to the free ends of the arms 16 and 19, are the bearing plates 30 in which the shaft 31 operates, the shaft 31 providing a support for the rollers 32 which rollers contact the surface over which the machine is moving, to control the vertical movements of the edging disc or blade 21.

In order that the attachment will be securely braced against lateral strain, the brace bar 33 is provided, the brace bar 33 having pivotal connection with the attachment frame, at 34, while the opposite end of the brace bar 33 is formed with the hook 35 which fits around the bolt 36 that is threaded in an opening formed in the platform 6, the bolt 36 having a head 37 by means of which the bolt may be positioned, with the result that the brace bar 33 will be securely held against displacement, but at the same time may be readily removed, when it is desired to demount the attachment.

From the foregoing it will be seen that due to the construction shown and described, I have provided an edging attachment which may be readily and easily swung upwardly to its inactive position, or may be readily demounted when it is desirable to use the power mower without the edging attachment. It will also be noted that the device may be readily and easily attached with the minimum amount of effort on the part of the operator, when it is desirable to edge a lawn.

Having thus described the invention, what is claimed is:

1. A lawn edging attachment for a power mower having a platform, comprising a stand mounted on said platform, spaced bearings on the stand, a power shaft removably mounted within the bearings, a circular line of teeth extending from one of said bearings, a vertically swinging supporting arm having an opening and a circular line of teeth surrounding the opening, the teeth of the arm cooperating with the teeth of said bearing in holding said arm in adjusted positions, a stub shaft extending from the bearing having teeth, the stub shaft being disposed in the opening of the supporting arm securing the supporting arm to the stand, a horizontally disposed shaft mounted adjacent to the free end of said supporting arm, an edging disc mounted on one end of the shaft supported on said arm operating in advance of the mower, and means for transmitting power from the power mower to the power shaft of the attachment and shaft on which said edging disc is mounted.

2. A lawn edging attachment for a power mower having a platform, comprising a stand mounted on the platform, bearings on the stand, a power shaft operating in the bearings, teeth extending from one of said bearings, a vertically adjustable supporting arm having a bearing mounted on the stand, teeth on said arm engaging the teeth on said bearing securing the supporting arm in various positions of vertical adjustment, a curved laterally extended arm secured to said supporting arm, said curved arm and supporting arm having aligning bearings, an edging disc shaft mounted in the aligning bearings, an edging disc secured on the edging disc shaft operating in advance of the mower, and means for transmitting power from the power mower to the power and edging discs.

JOHN D. NOYES.

References Cited in the file of this patent

UNITED STATES PATENTS

| Number | Name | Date |
|---|---|---|
| 2,494,271 | Turner et al. | Jan. 10, 1950 |
| 2,521,033 | Bell | Sept. 5, 1950 |